(12) United States Patent
Ormson et al.

(10) Patent No.: US 7,289,829 B2
(45) Date of Patent: Oct. 30, 2007

(54) MOBILE COMMUNICATIONS DEVICE WITH MAIN DISPLAY AREA AND TOUCH SENSITIVE DISPLAY AREA AND KEYPAD

(75) Inventors: Richard Ormson, Berkshire (GB); Mark Wallis, Berkshire (GB)

(73) Assignee: NEC Corporation, Tokyo (JP)

( * ) Notice: Subject to any disclaimer, the term of this patent is extended or adjusted under 35 U.S.C. 154(b) by 430 days.

(21) Appl. No.: 09/989,683

(22) Filed: Nov. 21, 2001

(65) Prior Publication Data

US 2002/0065103 A1    May 30, 2002

(30) Foreign Application Priority Data

Nov. 22, 2000   (GB)   ................................. 0028489.3

(51) Int. Cl.
*H04Q 7/32*   (2006.01)
(52) U.S. Cl. ..................................... 455/566; 455/556.2
(58) Field of Classification Search ................ 455/566, 455/575.1–575.9, 556.2; 345/173, 168
See application file for complete search history.

(56) References Cited

U.S. PATENT DOCUMENTS 5,742,894 A * 4/1998 Jambhekar et al. ...... 455/575.3
6,198,948 B1 * 3/2001 Sudo et al. .................. 455/566
6,271,835 B1 * 8/2001 Hoeksma ..................... 345/168
6,349,220 B1   2/2002 Prior et al.
6,608,637 B1 * 8/2003 Beaton et al. .......... 455/566 X
6,714,802 B1 * 3/2004 Barvesten ................ 455/575.1
6,751,487 B1 * 6/2004 Rydbeck et al. ......... 455/575.3

FOREIGN PATENT DOCUMENTS

CN   1222806   7/1999
GB   2330982   5/1999

* cited by examiner

*Primary Examiner*—Philip J. Sobutka
(74) *Attorney, Agent, or Firm*—Foley & Lardner LLP

(57) ABSTRACT

A mobile communications device having a main display area for displaying information to a user and a keypad for user data entry. The device further comprises a touch sensitive display area configured to display one or more function keys and to allow selection of the one or more functions by contact with the touch sensitive display area.

7 Claims, 3 Drawing Sheets

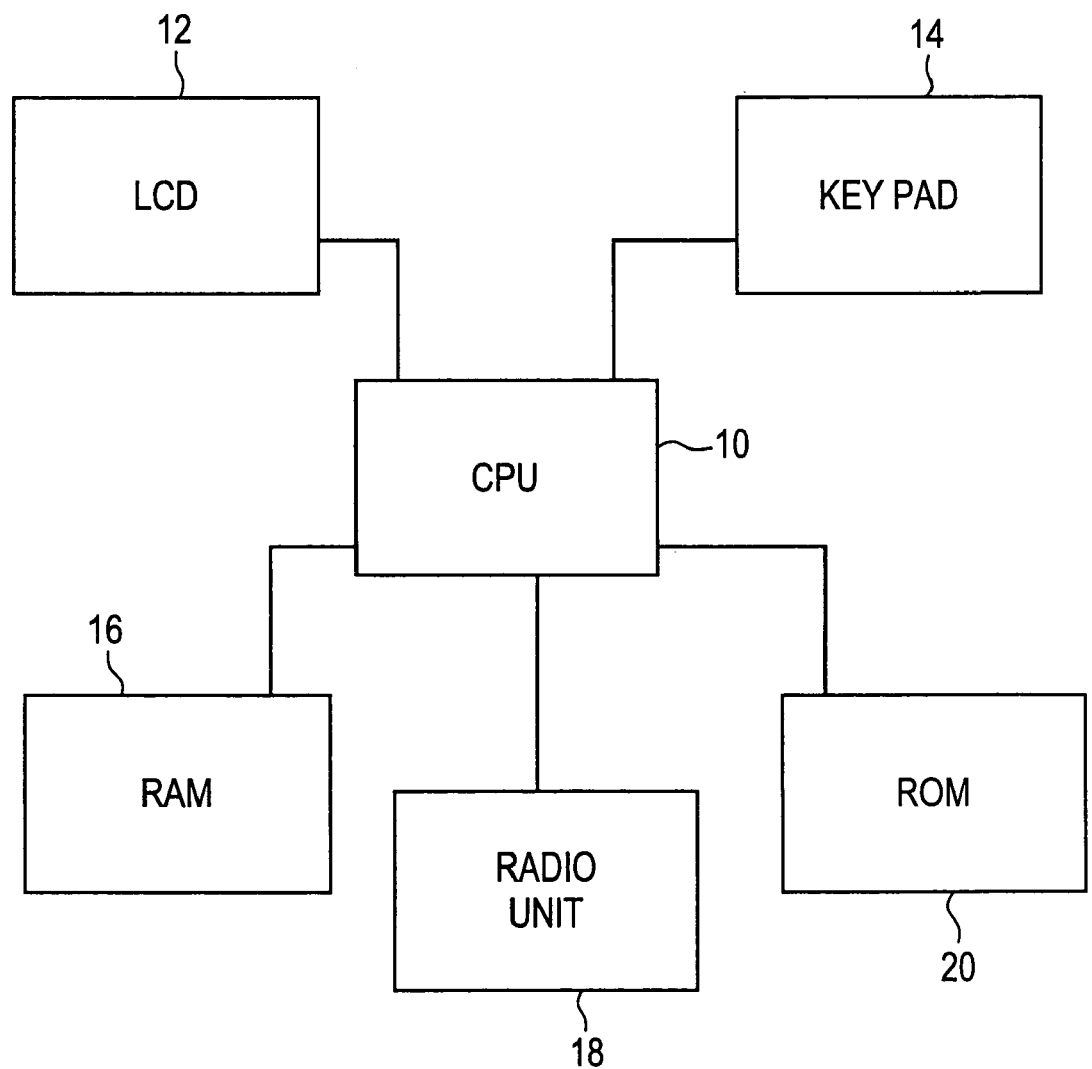

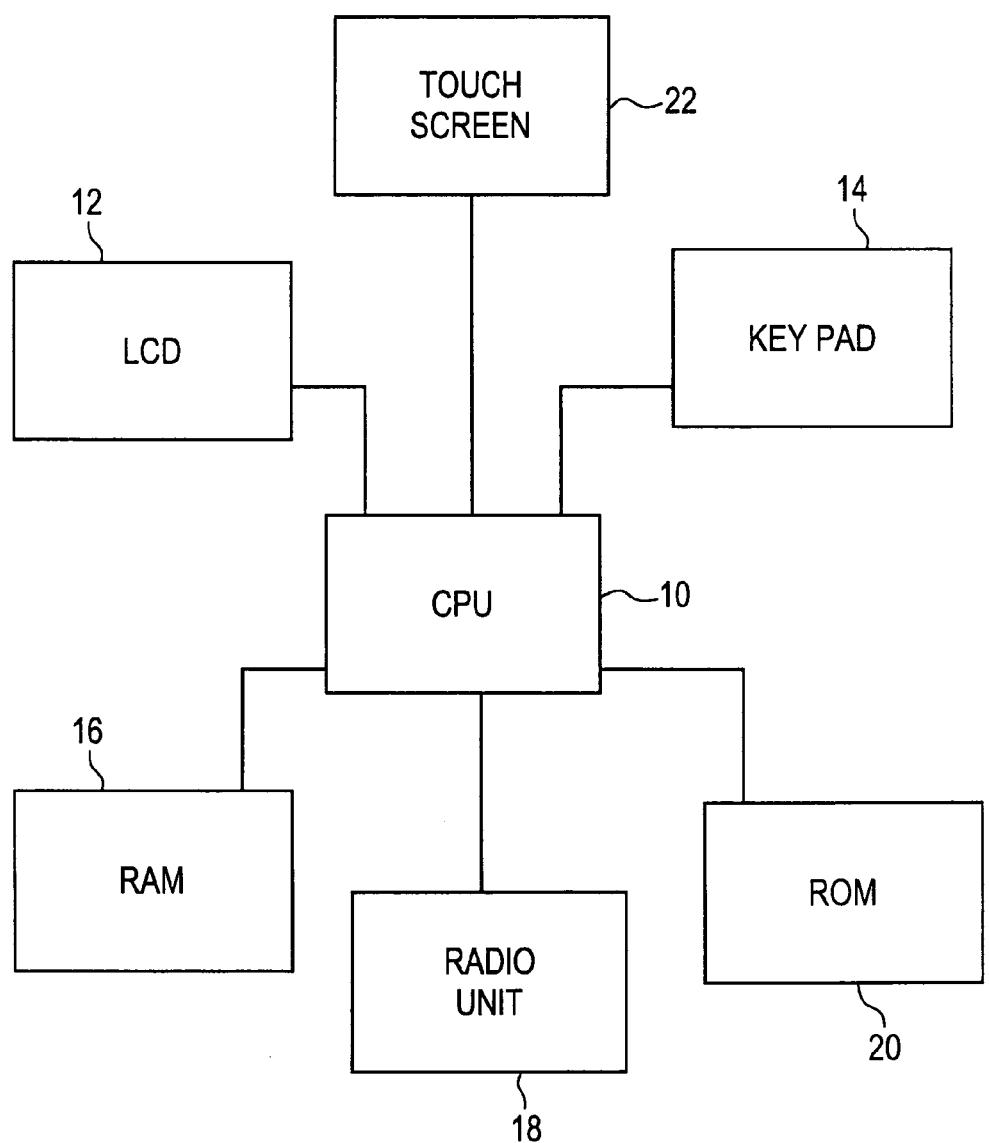

MOBILE COMMUNICATIONS DEVICE WITH MAIN DISPLAY AREA AND TOUCH SENSITIVE DISPLAY AREA AND KEYPAD

BACKGROUND OF THE INVENTION

Field of the Invention

The present invention relates to a mobile communications device display, such as a display for mobile telephones, WAP devices and the like.

Mobile communications have developed significantly in recent years and encompas devices such as mobile telephones, pagers, smartphones and personal data assistants (PDA's). One currently emerging protocol for such devices is Wireless Application Protocol (WAP).

WAP provides a medium to connect user devices to online services, such as the Internet, and is based on Internet standards such as HTTP and XML. To achieve appropriate data rates in WAP devices, binary transmission is used for greater compression of data and is optimised for long latency and low to medium bandwidth. The quality of transmission is increasingly important as graphics form part of the data content in addition to hypertext using WML. The WML language used for WAP content makes optimum use of small screens and allows easy navigation with one hand without a full keyboard.

There are constraints, however, on the each of use of WAP devices. To be easily portable, mobile communications devices must be small. As a result, through, the screens as such devices are also necessarily small. The size of the screen-display is a premium in such devices to provide uses with useful and visible text and graphics.

Protocols such as WAP allow uses to interact with presented text and graphics through a mixture of "hard" and "soft" keys. The hard keys are those with dedicated functions for text or numbers, and the soft keys are there with variable functions depending on the context. In WAP there are 6 soft keys defined; accept, delete, help, options, prev and reset which are labelled by a reserved area of the display. The text labelling each key is presented on the conventional display area of the telephone. We have appreciated the need to provide ease of operation of a mobile communications device whilst retaining as much useable display area as possible. We have also appreciated that mobile device protocols typically require one or more "soft" keys whose functions change depending upon the context.

SUMMARY OF THE INVENTION

In a broad aspect, the invention provides a mobile communications device comprising a main display area for displaying information to a user and a keypad for user data entry, the device further comprising a touch sensitive display area configured to display one or more user input options and to allow selection of the one or more user input options by contact with the touch sensitive display area.

The invention provides the advantage that context sensitive function keys are displayed to a user without using valuable area on the main display area. A device embodying the invention can thus use less area to present "soft" keys than the present arrangement.

The invention does not require replacement of the whole keypad with the cost that this would incur. In addition, there is no need for processing a full XY grid touch screen or for providing power that would be required for the whole screen to act as a keypad. The touch sensitive display area only needs to report that a particular area has been touched, not a particular pair of coordinates.

BRIEF DESCRIPTION OF THE FIGURES

An embodiment of the invention will now be described, by way of example only, and with reference to the figures in which:

FIG. 2 is a block diagram of the main components of a mobile telephone;

FIG. 4 is a block diagram of the main components of a mobile telephone embodying the invention.

DESCRIPTION OF THE PREFERRED EMBODIMENT

Figure 1:
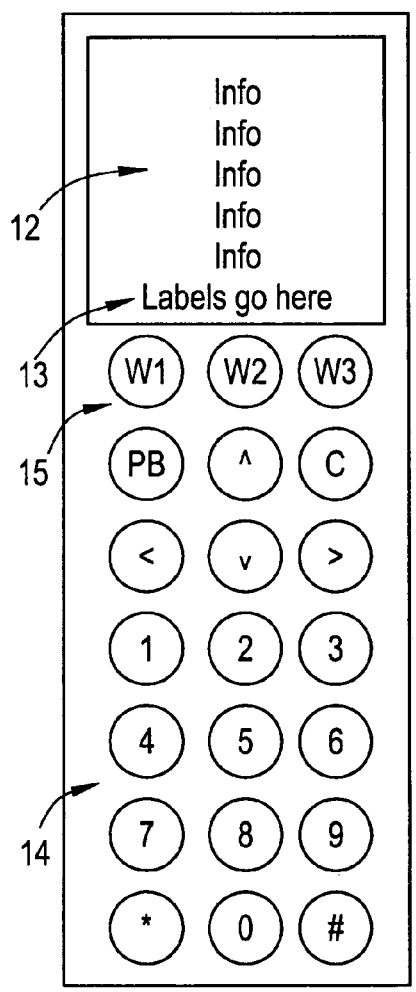
FIG. 1 is a schematic view of an existing mobile telephone.

The basic visible components of a mobile telephone are shown in the schematic view of FIG. 1. A display 12 provides information to a user such as number dialled, address book and so on. Mobile telephones with other functions such as those provided by WAP also display hypertext and graphics. A portion of the display 12 provides a label area 13 which indicates the functions of three "soft" keys 15 on a keypad 14. The "soft" keys vary in their functionality depending upon the status of material shown on the display.

As an example, the "soft" keys 15 allow navigation around menus, to go forward and back on hypertext pages and other such functions. The function provided by each key is shown on the label area 13 of the display 12.

The main functional components of the telephone are shown in FIG. 2. A CPU 10 provides all logical controls through software in ROM 20. A RAM 16 provides temporary storage for data such as text and images as well as more permanent data such as address books. The radio unit 18 provides the communications functions and includes digital processing circuitry for data sending and receipt, analogue to digital conversion for voice and RF transmission and reception. Appropriate circuitry for the radio unit is well known to the skilled person. The mobile telephone also includes a display 12 such as an LCD display, and a key pad 14 as previously described.

Figure 3:
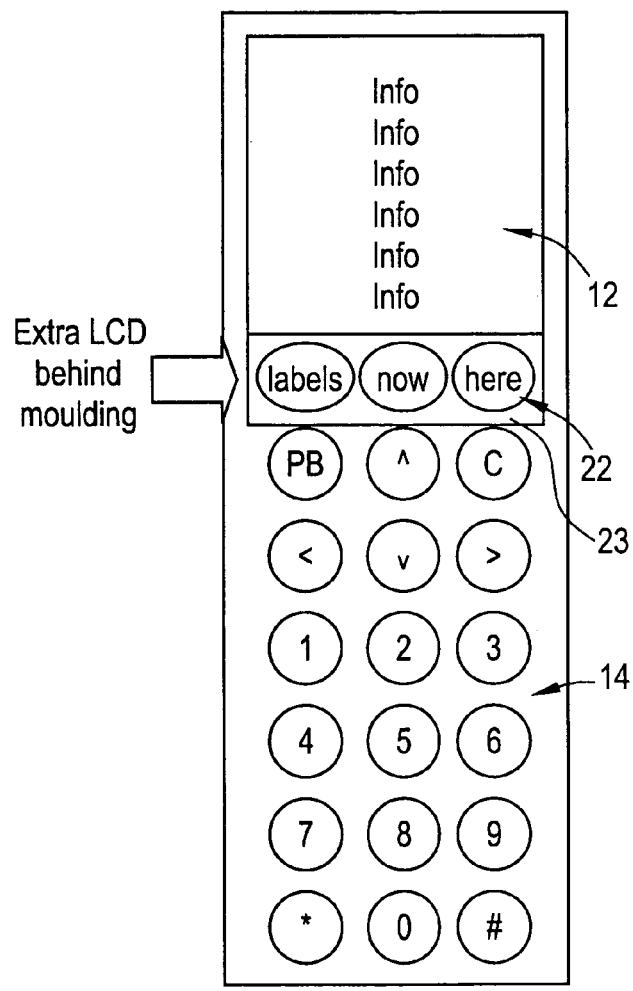
FIG. 3 is a schematic view of a mobile telephone embodying the invention.

A schematic view of a mobile telephone embodying the invention is shown in FIG. 3. Whilst the invention is particularly applicable to a WAP mobile telephone, it could apply to other portable communications devices, such as PDA's or personal communicators.

The mobile telephone includes a keypad 14 to allow user interaction to dial numbers and provide other input. The keypad is a conventional push button keypad known to those in the art. A display 12 is a liquid crystal display (LCD) which has sufficient resolution for text and graphics, typically 12 character width and 4 line height. Unlike the known mobile telephone described earlier, the embodiment of the invention has a touch screen area 22. The touch screen area 22 is configured to show different functions that can be accessed by pressing the relevant area of the touch screen. As can be seen by comparing FIG. 3 and FIG. 1, the "soft" function keys now do not occupy valuable space on the main display screen, but provide the label display and button functionality combined.

The main functional components of the embodiment are shown in FIG. 4. The mobile telephone comprises a CPU 10, RAM 16, ROM 20 and radio unit 18 as previously described. The CPU 10 provides interaction between the display 12, keypad 14 and the touch screen 22. The main display area 12 now has a larger area to display images and text without the requirement to display labels for the multi function keys 15 which are provided by the touch sensitive pad 22. The preferred type of touch sensitive screen 22 is one that registers whether it has been touched, rather than providing the coordinates of where it has been touched. The use of a stylus can be avoided because of this, and because the space between "keys" is sufficient for finger operation. The touch sensitive screen area 22 is preferably implemented by using a larger than normal main screen, with one line overlayed with a touch sensitive portion comprising a number of pads equal to the number of keys. A moulding 23 is preferably provided to mask all but the "key" sections. This ensures the user does not unintentionally activate more than one soft key. The input to the CPU can be the same as a normal physical keypad.

There are further embodiments possible within the scope of the invention. For example, a folded design of phone could have an additional touch sensitive screen on the keyboard half, with a main screen on the other half. The soft key labels could be displayed in a different font to distinguish them from the main display. Three soft keys are preferred, but other markers would be possible.

What is claimed is:

1. A mobile communications device comprising:
   a main display area for displaying information to a user;
   a keypad for user data entry; and
   a touch sensitive display area configured to display one or more function keys and to allow selection of one or more functions by contact with the one or more function keys;
   wherein the touch sensitive display area is arranged between the main display area and the keypad; and
   wherein the touch sensitive display area has a mask to show the one or more function keys as separate keys.

2. A mobile communications device as recited in claim 1, wherein the main display area and touch sensitive display area are each part of a single display.

3. A mobile communications device according to claim 1, wherein the device is a mobile telephone.

4. A mobile communications device according to claim 1, wherein the mask overlies the touch sensitive display area and has holes that allow for an insertion of a user's finger to operate the one or more function keys.

5. A mobile communications device comprising:
   a main display area for displaying information to a user;
   a keypad for user data entry; and
   a touch sensitive display area configured to display one or more function keys and to allow selection of one or more functions by contact with the one or more function keys;
   wherein the touch sensitive display area has a mask to show the one or more function keys as separate keys, and
   wherein the mask overlies the touch sensitive display area and has holes that allow for an insertion of a user's finger to operate the one or more function keys.

6. A mobile communications device according to claim 5, wherein the main display area and touch sensitive display area are each part of a single display.

7. A mobile communications device according to claim 5, wherein the device is a mobile telephone.

* * * * *